United States Patent [19]

Baxter

[11] Patent Number: 4,871,188
[45] Date of Patent: Oct. 3, 1989

[54] WHEELED VEHICLE SUSPENSION

[75] Inventor: Bobby G. Baxter, Warren County, Mo.

[73] Assignee: Reel 4926, Frames 491 & 492, Warrenton, Mo.

[21] Appl. No.: 220,606

[22] Filed: Jul. 18, 1988

Related U.S. Application Data

[63] Continuation-in-part of Ser. No. 9,503, Feb. 2, 1987, Pat. No. 4,789,181.

[51] Int. Cl.⁴ .............................................. B60G 5/00
[52] U.S. Cl. ................................... 280/680; 280/686
[58] Field of Search .............. 280/677, 678, 680, 681, 280/682, 686; 167/47, 52, 260

[56] References Cited

U.S. PATENT DOCUMENTS

| | | | |
|---|---|---|---|
| 3,173,669 | 3/1965 | Chutz | 267/52 |
| 3,367,677 | 2/1968 | Preddy, Jr. | 280/680 |
| 3,520,548 | 7/1970 | McGee | 280/678 |
| 3,614,123 | 10/1971 | Raidel | 267/52 |
| 4,322,061 | 3/1982 | Masser | 267/52 |
| 4,611,793 | 9/1986 | Nishiyama et al. | 267/52 |
| 4,688,778 | 8/1987 | Woltron | 267/47 |

Primary Examiner—Kenneth R. Rice
Attorney, Agent, or Firm—Senniger, Powers, Leavitt and Roedel

[57] ABSTRACT

A suspension for tandem axles of a vehicle comprising a pair of walking beams, one for the right side and the other for the left side of the vehicle, each comprising a composite leaf spring comprising fibers embedded in a resin matrix, the fibers extending lengthwise of the spring.

25 Claims, 17 Drawing Sheets

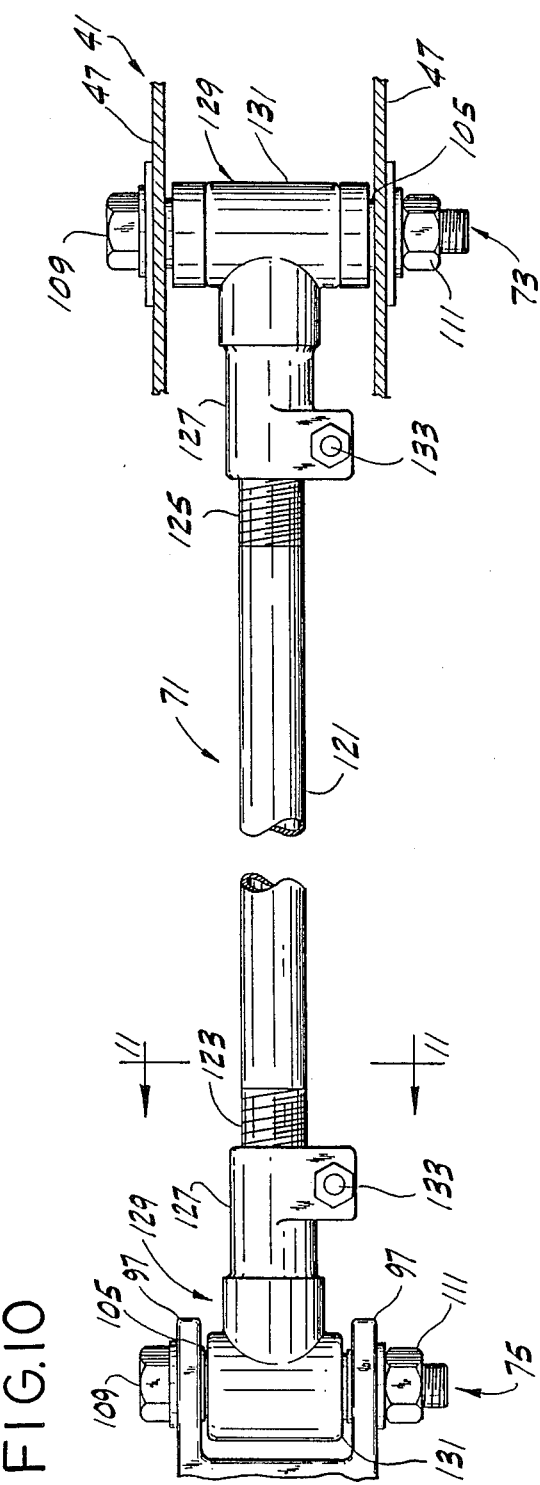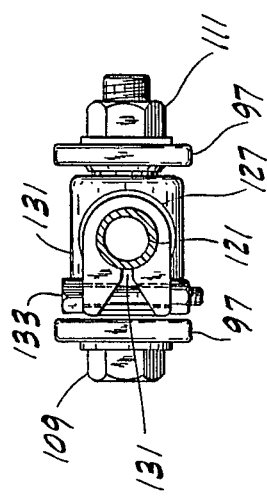

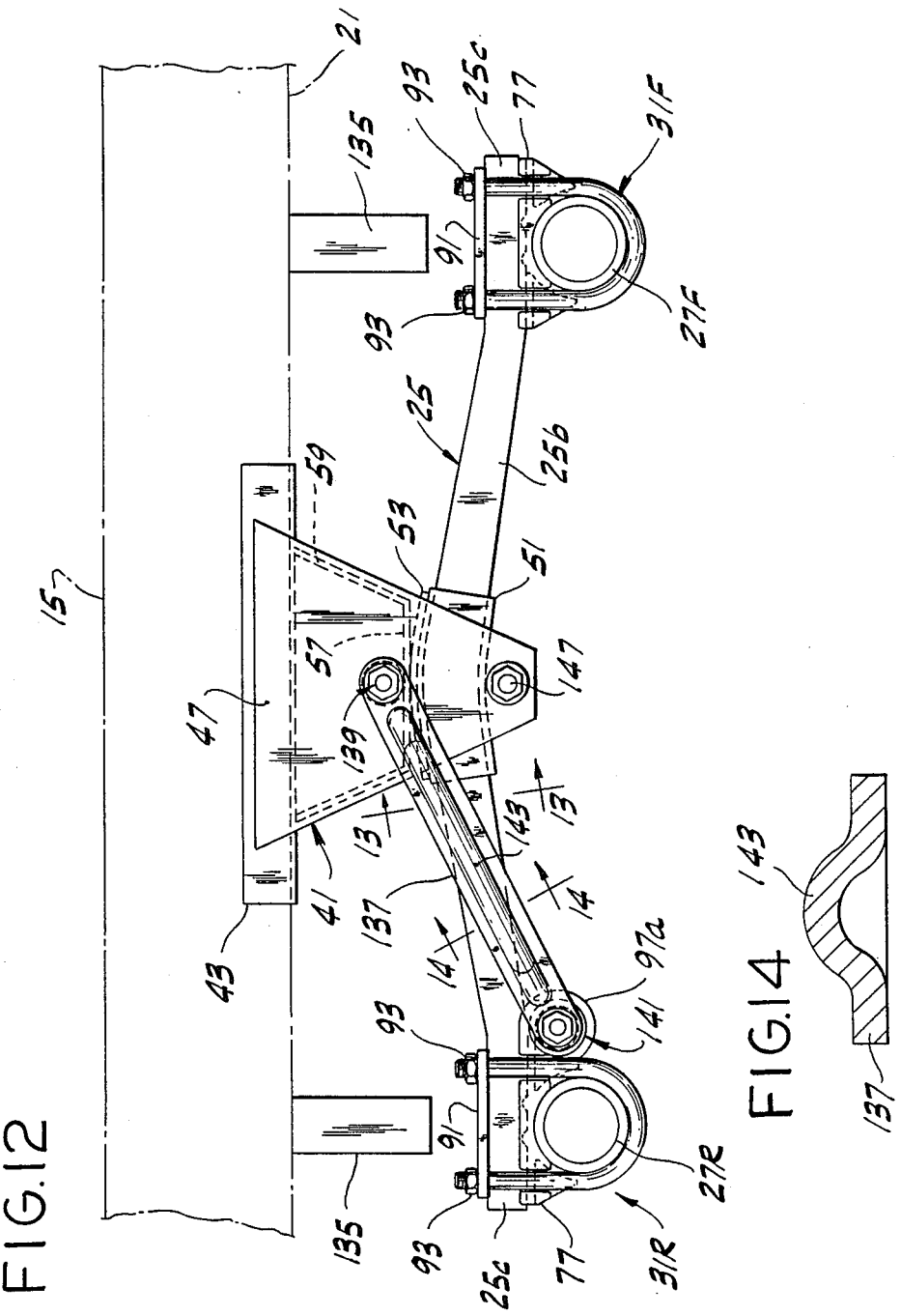

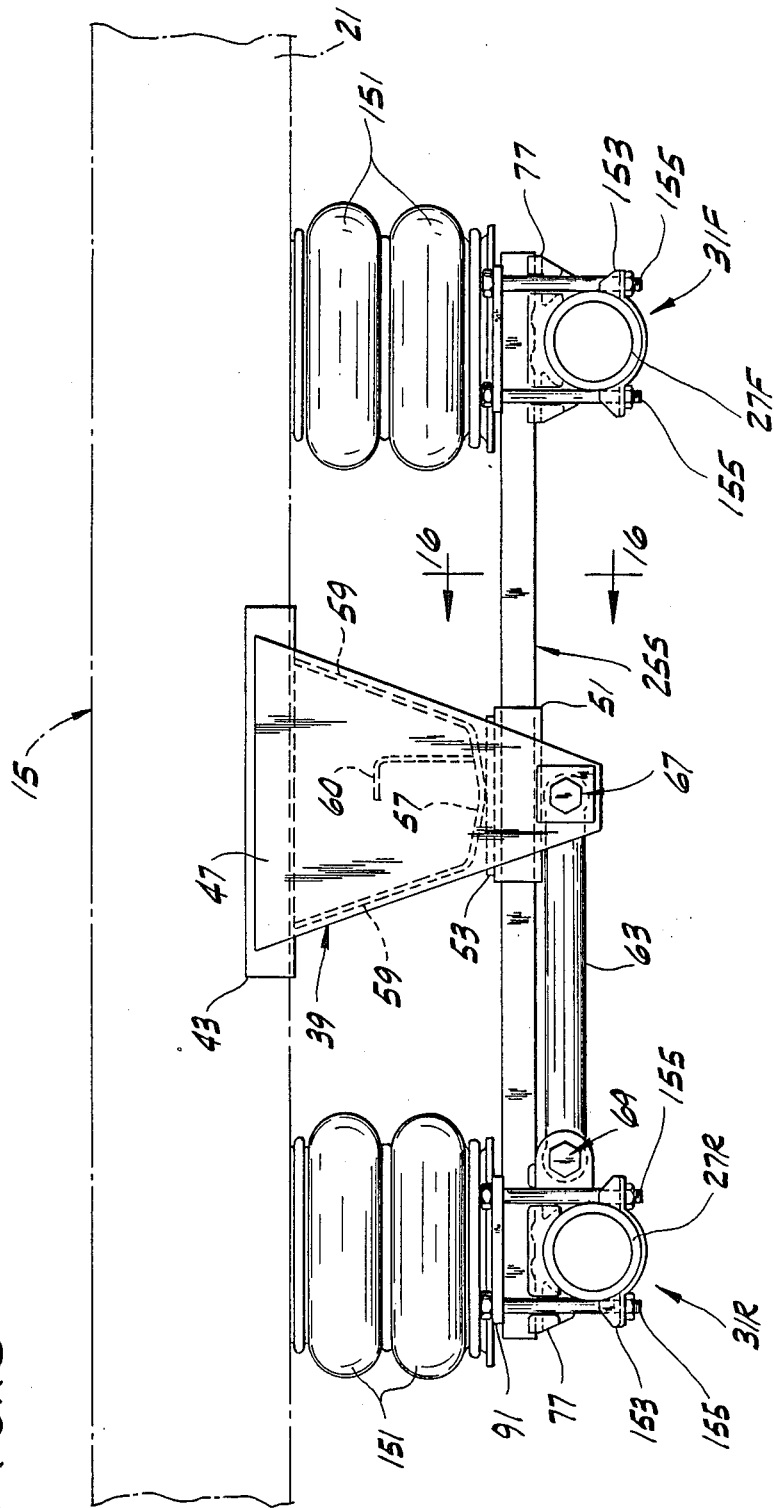

WHEELED VEHICLE SUSPENSION

CROSS REFERENCE TO RELATED APPLICATION

This application is a continuation-in-part of my U.S. application Ser. No. 009,503 filed Feb. 2, 1987, now U.S. Pat. No. 4,789,181 for Wheeled Vehicle Suspension, which is incorporated herein by reference.

BRIEF SUMMARY OF THE INVENTION

This invention relates to wheeled vehicle suspensions, and more particularly to tandem axle suspensions, also referred to as bogies.

The invention is especially concerned with tandem axle suspensions for trailers, involving a suspension of a type which may be referred to as a walking beam suspension in that it comprises a pair of members which are swingable like the walking beams of the aforesaid parent U.S. application Ser. No. 009,503, one for the right side and the other for the left side of the trailer, and a pair of axles, one constituting a forward axle and the other a rearward axle.

Among the several objects of the invention may be noted the provision of a suspension generally of the tandem axle walking beam type generally having certain of the advantages of the walking beam suspension of my said U.S. application Ser. No. 009,503 and further having the advantages of achieving equalization of axle loads while enabling substantial reduction in weight of the suspension for a given loading, easier and hence lower-cost assembly with precision in assembly to insure parallelism of the axles, and increased life (durability) with less maintenance, particularly so in respect to prior suspensions utilizing steel leaf springs.

In general, a suspension of this invention, for tandem axles of a vehicle, comprises a pair of walking beams, one for the right side and one for the left side of the vehicle, each beam comprising a composite leaf spring comprising fibers embedded in a resin matrix, the fibers extending lengthwise of the spring, and a pair of axles, one constituting a forward axle and the other a rearward axle. The forward axle is attached to the springs adjacent their forward ends and the rearward axle is attached to the springs adjacent their rearward ends. Means located generally centrally of the springs mounts them toward the sides of the body of the vehicle below the bottom of the body with each spring extending longitudinally of the vehicle and with each spring swingable generally about the center of the length of the beam in a generally vertical plane one way or the other from a horizontal position. The suspension further comprises means for restraining each spring from longitudinal movement relative to its said mounting means.

Other objects and features will be in part apparent and in part pointed out hereinafter.

BRIEF DESCRIPTION OF THE DRAWINGS

FIG. 10 is a view generally on line 10—10 of FIG. 4 of an adjustable drag link of the suspension, parts being broken away and parts being shown in section;

FIG. 11 is a view in section on line 11—11 of FIG. 10;

FIG. 12 is a view similar to FIG. 2 showing a modification;

FIG. 13 and 14 are views in section generally on lines 13—13 and 14—14, respectively, of FIG. 12;

FIG. 15 is a view similar to FIG. 2 showing another modification;

Corresponding reference characters indicate corresponding parts throughout the several views of the drawings.

DETAILED DESCRIPTION

Figure 1:
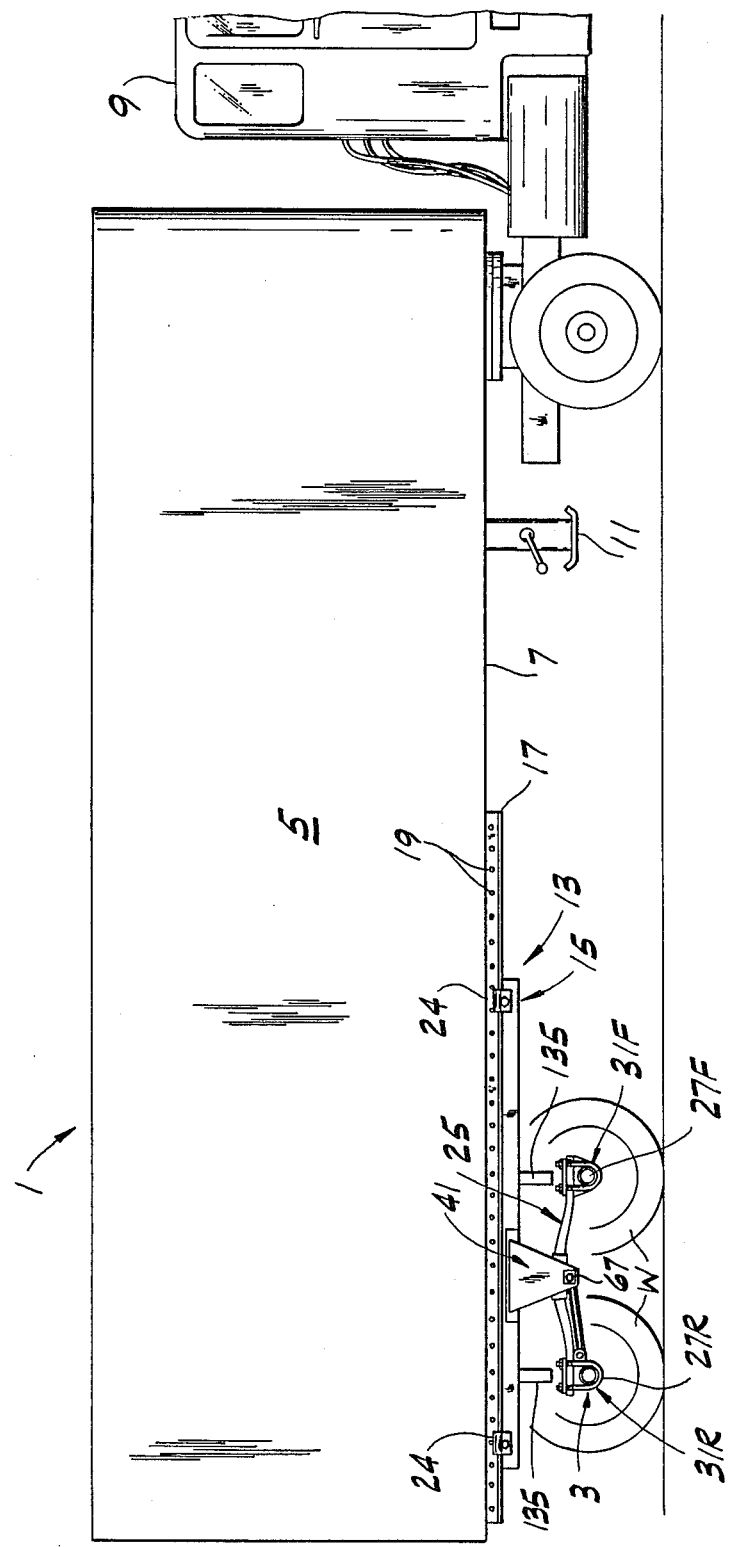
FIG. 1 is a view in side elevation of a trailer equipped with a tandem axle suspension of this invention, with the wheels on the near side of the suspension removed to show detail, and including a showing of a tractor for pulling the trailer, the composite spring walking beam on the near side of the suspension being shown in horizontal position.

Referring to FIG. 1 of the drawings, a vehicle and more particularly a trailer indicated in its entirety by the reference numeral 1 is shown with a suspension of this invention indicated in its entirety by the reference numeral 3 adjacent its rear end. The trailer, as herein illustrated and as illustrated in the said parent application Ser. No. 009,503, is one in which the body is a van identified by the reference numeral 5, the bottom of the van being indicated at 7. The trailer is shown with its forward end coupled to a tractor 9, and its landing gear is indicated at 11.

Figure 4:
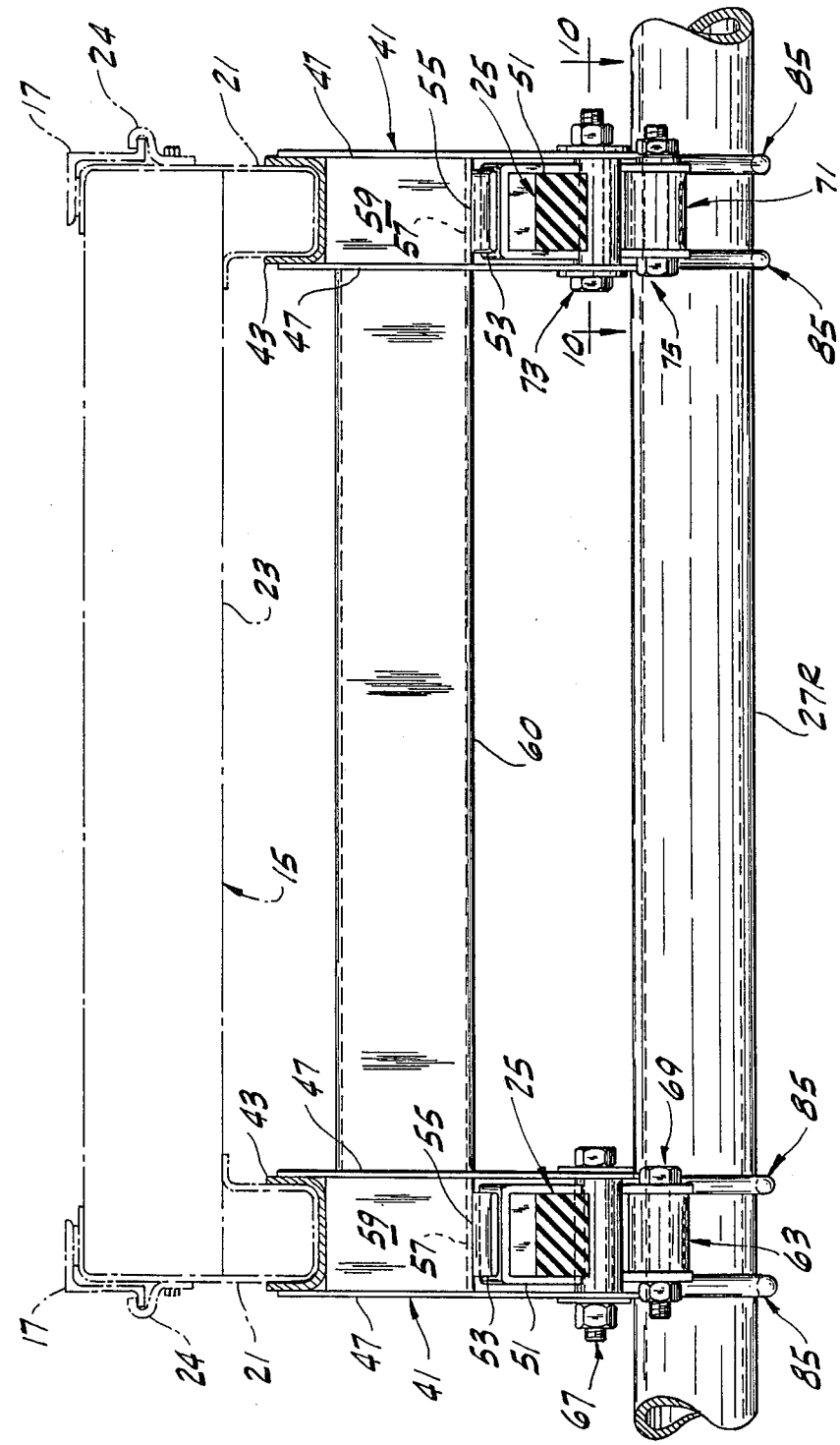
FIG. 4 is a view generally in vertical section on line 4—4 of FIG. 2.

The suspension 3 may be either fixedly secured to the bottom 7 of the body 5 of the trailer 1, without the capability of adjustment of its position longitudinally with respect to the body, or it may be mounted for adjustment longitudinally of the body by means of a slide such as that sold under the trademark LITE-SLIDE by The Binkley Company, of Warrenton, Mo., the assignee of this invention. As herein illustrated, the suspension 3 is mounted for adjustment longitudinally of the body by means of such a slide, indicated its entirety at 13 in FIGS. 1, 2 and 4 and comprising a frame generally designated 15 slidable longitudinally on the bottom of the body on left and right side rails each designated 17 which are affixed to the bottom of the body, the frame being adapted to be locked in various positions of adjustment endwise of the body by locking pins (not shown) engageable in one set of holes 19 of a series of holes in the rails. In general, the slidable frame 15 comprises left and right side members each designated 21 and cross members one of which is indicated at 23 in FIG. 4 with the side members 21 mounted as indicated at 24 for sliding movement on the rails 17.

Figure 3:
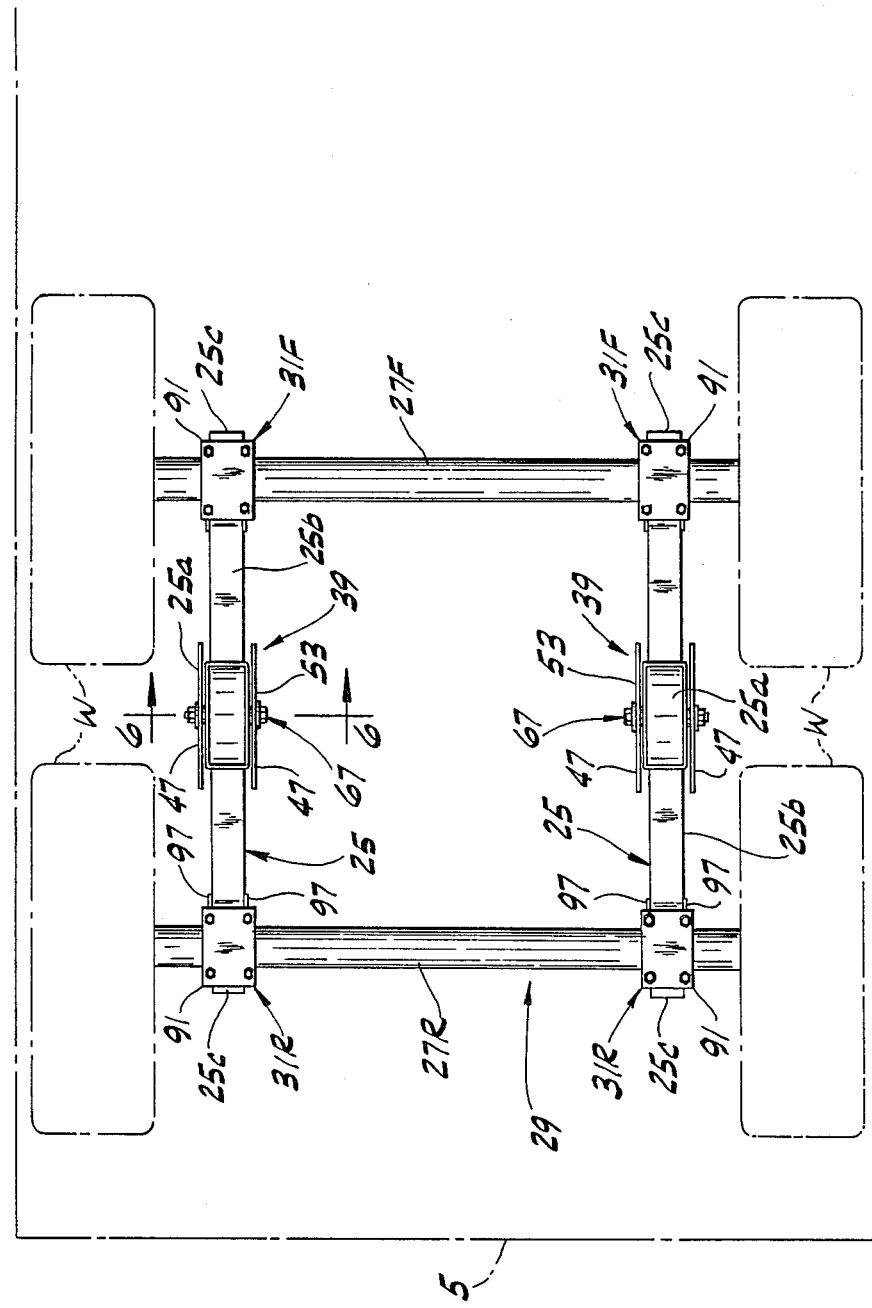
FIG. 3 is a view generally in horizontal section on line 3—3 of FIG. 2.

Basically, the suspension 3 comprises a pair of members which may be referred to as walking beams, each designated 25, one for the right side and the other for the left side of the vehicle, and a pair of axles, shown as round axles, one constituting a forward axle designated 27F and the other a rearward axle designated 27R. These four elements are interconnected to form what amounts to a generally rectangular frame designated in its entirety by the reference numeral 29 in FIG. 3 with the walking beams constituting the sides of the frame and the forward and rearward axles the front and rear of the frame. The forward axle is rigidly attached to the beams adjacent each end thereof by a joint generally designated 31F and the rearward axle is rigidly attached to the beams adjacent each of its ends by a joint 31R, which joints will be subsequently described in detail. The wheels of the vehicle are indicated at W. They are mounted for rotation at the ends of the axles with the usual brakes therefor. While only one wheel is shown at each end of each axle, it will be understood that more than one wheel may be provided at each end of each axle, and the term "wheel" as used hereinafter is intended to cover either one or plural wheels.

Figure 2:
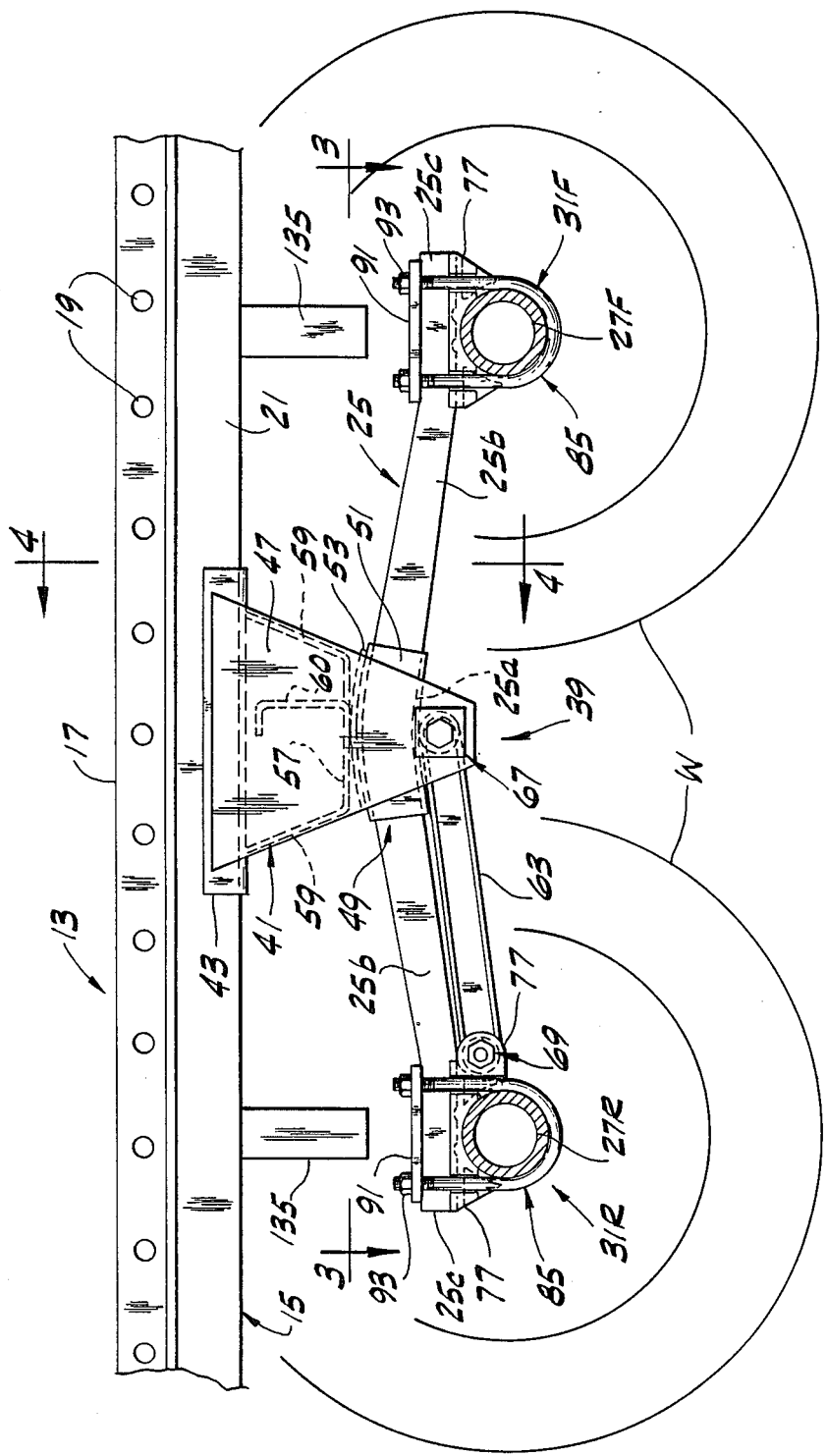
FIG. 2 is an enlarged fragment of FIG. 1 illustrating the suspension.
Figure 5:
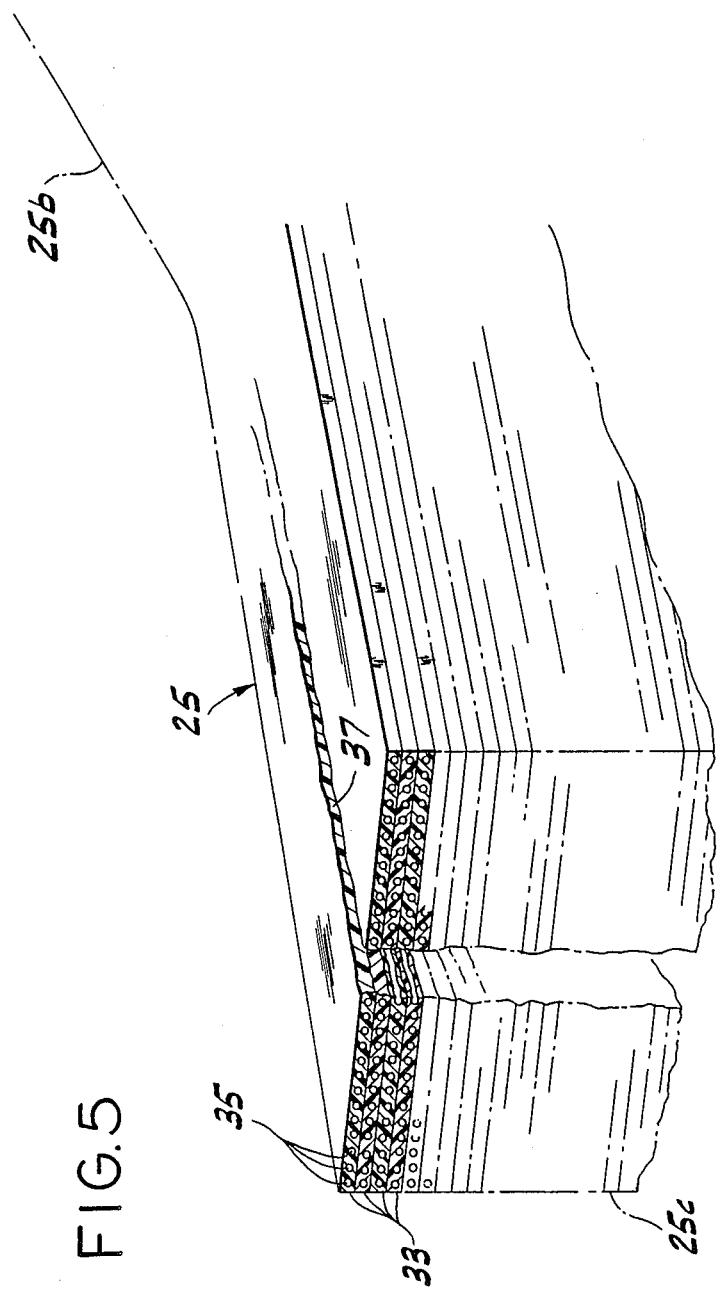
FIG. 5 is a view showing detail of a composite spring of the suspension, on a much larger scale than FIGS. 1-4, with part of the spring broken away.

In accordance with this invention, each of the walking beams 25 comprises a composite leaf spring which, as illustrated in FIG. 5 comprises a plurality of layers 33 each comprising a plurality of unidirectional fibers 35 such as glass or carbon fibers, preferably glass fibers, embedded in a resin matrix 37, such as an epoxy resin matrix. In each layer, the fibers extend lengthwise with respect to the spring, relatively closely side-by-side. The spring, comprising the plurality of layers 33, is made by a hot compression molding process in which the layers are being bonded together. As shown in FIG. 2, each of the beams or springs 25 is molded to have an upwardly arched configuration, with a generally convexly curved central portion or crown 25a, generally straight leg portions 25b extending outwardly and downwardly from the central portion, and generally straight end portions 25c extending out from the outer ends of portions 25b, the end portions 25c being horizontal when the vehicle is horizontal. Each of the leg portions 25b may be of somewhat diminishing thickness from the ends of the central portion or crown 25a out to the end portions 25c. This tapering of the leg portions may be accomplished by molding the spring with some of the layers 33 shorter than the overall length of the other layers. The end portions 25c are formed in the molding process with transversely extending rounded grooves 38 (see particularly FIG. 7) in the bottom, for a purpose to be made clear.

Means indicated at 39 located generally centrally of the springs 25 mounts the springs on the side members 21 of the slide 13 toward the sides of the body 5 of the vehicle below the bottom of the body with each spring normally in a generally vertical plane which extends longitudinally of the vehicle, with each spring extending longitudinally of the vehicle, swingable generally on a generally indeterminate (unfixed) axis extending transversely of the vehicle generally centrally of the length and height of the crown of the spring in a vertical plane one way or the other from a horizontal position. This means 39 comprises, for each of the springs 25, a hanger or bracket generally designated 41 comprising a generally U-shaped or channel-section head member 43 secured in suitable manner, e.g., by welding, to the respective side member 21 of the frame 15 of the slide 13 with the side flanges of the member 43 on opposite sides of the side member 21, and side members constituted by plates 47 secured as by welding to the outside of the side flanges of the head member 43 and extending downwardly therefrom as shown best in FIG. 4.

Each beam or composite spring 25 extends longitudinally with respect to the vehicle through the respective hanger 41, the central portion or crown 25a of the spring being located between the side plates 47 of the hanger. These plates, as shown in FIG. 2, may be generally of triangular shape. The crown 25a of the spring is provided with wear-resistant means generally designated 49, shown as comprising a sleeve 51 of wear-resistant material such as and preferably ultra high molecular weight polyethylene surrounding and bonded to the crown. This sleeve is generally of rectangular cross section corresponding to the cross section of the crown of the spring with a relatively thick top portion 53. The sleeve is of convexly curved conformation from end to end thereof along with the crown of the spring, its thick top portion having a top surface 55 which is convexly curved from end to end. It is contemplated that the crown portion of the spring may be straight, in which case the sleeve is formed to have a top of diminishing thickness from its center out to its ends with the top surface thereof convexly curved from end to end.

In each hanger or bracket 41 above the crown of the respective spring 25 with the sleeve 51 thereon is a generally flat plate 57 which bears down on the convexly curved top surface 55 of the sleeve 51 for transmitting a proportional part of the weight of the body of the vehicle and its cargo to the spring at the crown of the spring. This plate 57 may thus be referred to as a load-transmitting means or member. It has stiffening flanges 59 extending up from its forward and rearward margins generally parallel to and inwardly of the forward and rearward edges of the side plates 47 of the hanger, plate 57 and its flanges 59 being welded at the side edges thereof to the inside faces of side plates 47. The beam or spring 25 is adapted to rock or roll at its crown 25a on the bottom of the plate 57 about a generally indeterminate (unfixed) axis extending generally transversely of the vehicle (and the spring) generally centrally of the spring by reason of the convexity of the surface 55 of the crown. At 60 is indicated a brace extending between the inside plates 47 of the two hangers.

Figure 6:
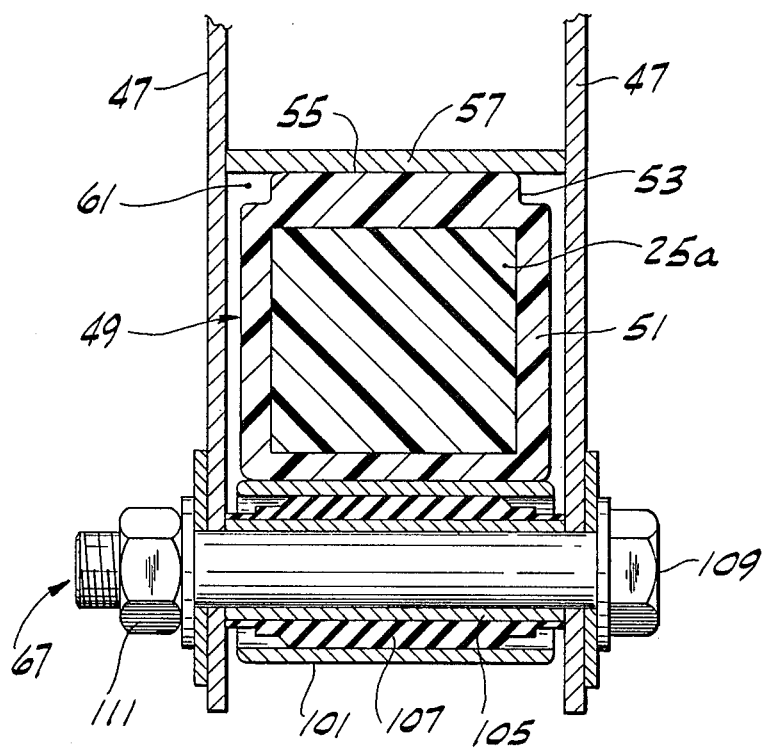
FIG. 6 is an enlarged vertical section on line 6—6 of FIG. 3.

The side plates 47 of the hanger or bracket 41 in conjunction with the plate 57 and means to be more particularly described below the crown 25a of the spring define a space 61 (see FIG. 6) for receiving the crown 25a of the spring (including the wear-resistant sleeve 51), this space being slightly wider and higher than the sleeve so that the spring is free to swing by rolling or rocking on the bottom face of plate 57 within limits relative to the hanger. With the side members or plates 47 of the hanger having their inside faces spaced transversely with respect to the vehicle a distance such that said space 61 in the hanger is slightly wider than the sleeve 51, the spring is thereby generally restrained from lateral movement one way or the other (note from FIG. 6 how the outside surfaces of the sides of the sleeve 51 are relatively closely adjacent the inside surfaces of the side plates 47 for this purpose). Each of the two springs 25 is also restrained from longitudinal movement relative to the vehicle, while retaining its rocking capability, by a link which may be referred as a drag link pivotally connected at one end to the respective hanger and at the other to the spring adjacent the attachment of one of the axles to the spring. Thus, as herein illustrated, the right-hand spring 25 may be restrained from longitudinal movement relative to the vehicle by a fixed-length drag link 63 pin-connected with one end constituting the forward end thereof with respect to the direction of forward travel of the vehicle in the hanger by means of a rubber-bushed pin joint generally designated 67 below the crown of the beam and at the other (rearward) end to the respective rear axle joint 31R by a rubber-bushed pin joint generally designated 69. The left-hand spring 25 may be restrained from longitudinal movement relative to the vehicle by an adjustable-length drag link 71 (see FIGS. 4 and 10) pinconnected at one end constituting the forward end thereof with respect to the direction forward travel of the vehicle in the respective hanger by means of a rubber-bushed pin joint generally designated 73 below the crown of the beam and at its rearward end to its respective rear axle joint 31R by a rubber-bushed pin joint generally designated 75.

Each rear axle joint 31R comprises an axle seat 77, e.g., a cast steel seat which may be referred to as an overslung seat, having a top surface 79 on which the rearward straight rear end portion 25c of the respective beam or spring 25 seats, and an arcuate recess 81 at the bottom in which the round rear axle 27R seats. The recess 81 is curved on an arc having a radius corresponding to that of the axle. The top 79 of the axle seat is flat except for two rounded tongues or keys 83 extending transversely thereacross matching the aforesaid rounded grooves or keyways 38 in the bottom of the respective rearward end portion 25c of the respective beam or spring 25. The seat 77 has upwardly extending flanges 84, of relatively low height, the spring end 25c fitting between these flanges. The rear axle 27R is clamped in the arcuate recess 81 by a pair of U-bolts, one on each side of the seat and the spring end. Each of these bolts, designated in its entirety by the reference numeral 85, has its lower curved portion 87 encircling the axle and its legs 89 extending up through holes in a clamp plate 91 on top of the spring end, nuts 93 being threaded on the upper ends of the legs of the bolt tightly to draw the bottoms of the U-bolts up against the axle to clamp it against the bottom of the seat in the recess and to clamp the plate down tightly on top of the beam end. The seat is provided with grooves 95 at the sides for locating the legs of the U-bolts. The tongues or keys 83 on the top of the seat extend parallel to the axis A constituting the central axis of the arcuate recess 81, and the grooves or keyways 38 extend at right angles to the length of the spring, the matching tongues and grooves 83 and 38 constituting interengaging registration means providing for accurate alignment of the axle 27R at right angles to the spring. For connection of links 63 and 71 at the rear end thereof by the pin joints 69 and 71 to the joint, each seat or casting 77 is formed with extensions 97 at the sides at its forward end, providing a clevis.

Each forward axle joint 31F is essentially identical to the rear axle joint 31R, except that it omits the clevis-forming extensions 97 (which are not needed since there are no drag links connected to the forward axle), and the parts of the forward axle joint 31F are designated by the same numbers as the corresponding parts of the rear axle joint 31R. In each of the joints 31F and 31R, the seats 77 and the axles may and preferably are suitably welded together after assembly.

Figure 8:
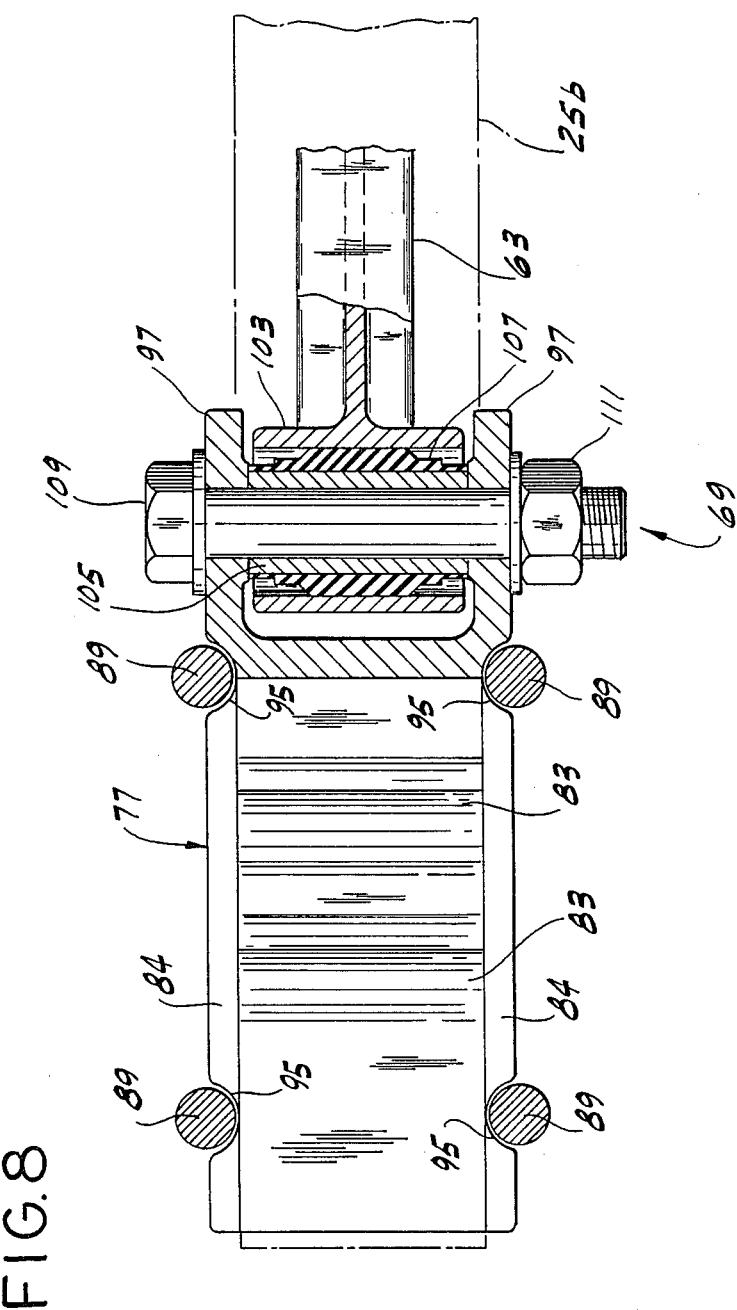
FIG. 8 is a view on line 8—8 of FIG. 7.
Figure 9:
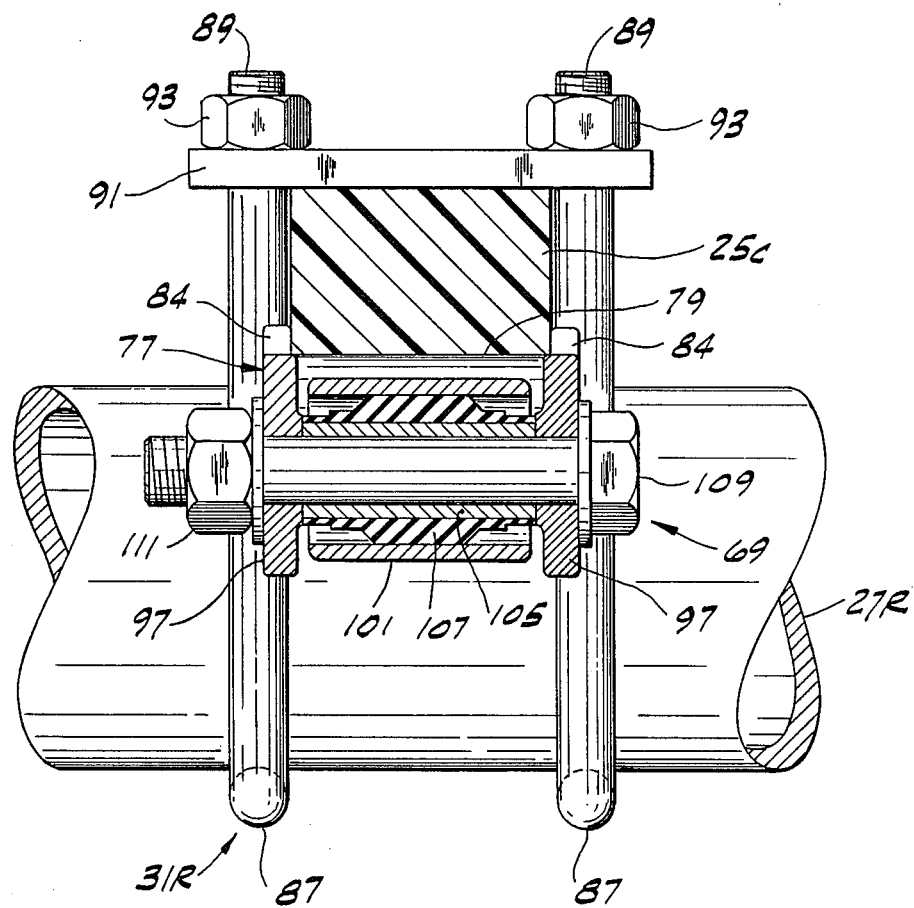
FIG. 9 is a view in section on line 9—9 of FIG. 7.

The fixed-length drag link 63 (which is the right-hand drag link of the suspension as viewed in the direction of travel of the vehicle, comprises a bar which may be of I section (see FIG. 8) with tubular cylindrical crossheads 101 and 103 at its forward and rearward ends.

The forward rubber-bushed pin joint 67 comprises a steel tube 105 having a rubber sleeve 107 bonded thereon which is press-fitted in the forward crosshead 101, the tube receiving a headed bolt 109 extending through bolt holes in the side plates 47 of the hanger 41 with a nut 111 threaded on the end of the bolt opposite the head and torqued to squeeze the side plates 47 against the ends of the tube 105. The rearward rubber bushed pin joint 69 similarly comprises a steel tube 105 having a rubber sleeve 107 bonded thereon which is press-fitted in the rearward crosshead 103, the tube receiving a headed bolt 109 extending through bolt holes in extensions 97 of the seat 77 with a nut 111 threaded on the end of the bolt opposite the head and torqued to squeeze the extensions 97 against the ends of the tube.

The adjustable length drag link 71 (which is the left-hand drag link of the suspension as viewed in the direction of travel of the the vehicle) comprises a rod 121, more particularly a tubular steel rod, having a standard screw thread on one end as indicated at 123 and a left-hand screw thread on the other as indicated at 125. Screw-threaded on each end 123 and 125 of the rod 121 is the stem 127 of a T-shaped end member 129, the head 131 of which is tubular. Each of the rubber-bushed pin joints 73 and 75, like the rubber-bushed pin joints at 67 and 69, comprises a steel tube 105 having a rubber sleeve 107 bonded thereon press-fitted in the bore of the head 131, a bolt 109 and a nut 111 threaded on the end of the bolt. The bolt 109 of the forward joint 73 extends through bolt holes in the hanger side plates 47 and its nut 111 is torqued to squeeze the side plates together against the ends of the respective tube 105. The bolt 109 of the rearward joint 75 extends through bolt holes in the extensions 97 of the respective seat 77 and the respective nut 111 is torqued to squeeze the extensions against the ends of the respective tube 105. The length of the link 71 is adjustable by turning the rod 121 one way or the other relative to the stems or sockets 127 of the T-shaped end members 129. These stems or sockets are split as indicated at 131 in FIG. 11 to function as clamps, and have clamping bolts as indicated at 133 which are loosened for adjusting the link length and tightened after the adjustment to hold the link length.

The means below the crown 25a of the spring 25 previously referred to comprises the forward crosshead 101 at the forward end of link 63 in the case of the right-hand hanger 41 and the forward crosshead 131 of the link 71 in the case of the left-hand hanger 41. These crossheads are so located as to allow room for the rocking of the springs.

In the course of normal travel of the vehicle on a smooth road, both the forward and rearward axles 27F and 27R are essentially horizontal and both the left and right springs 25 are essentially level. Should both the left and right front wheels encounter a bump at the same time, the forward axle 27F moves up relative to the body of the vehicle, and the forward ends of the springs may swing up and the rearward ends of the springs may swing down relative to the body of the vehicle. If the bump is such that both ends of the forward axle 27F move up equally, the forward axle remains horizontal. Should both the left and right rear wheels encounter a bump at the same time, the rearward axle 27R moves up relative to the body of the vehicle and the rearward ends of the springs may swing up and the forward ends of the springs may swing down relative to the body of the vehicle. If the bump is such that both ends of the rearward axle 27R move up equally, the rearward axle remains horizontal. It will be readily understood that the action is the opposite of the foregoing when the front wheels encounter a depression and the rear wheels encounter a depression. When any one of the wheels encounters a bump, the respective end (left or right) of the respective axle (27F or 27R) moves up relative to the body of the vehicle and the respective end of the respective spring 25 (forward or rearward end) may move up and its other end down relative to the body of the vehicle. Thus, for example, when the right front wheel encounters a bump, the right end of the forward axle 27F moves up relative to the body of the vehicle and the forward end of the right-hand spring 25 may move up and its rearward end down relative to the body of the vehicle. When any one of the wheels encounters a depression, the respective end of the respective axle moves down relative to the body of the vehicle and the respective end of the respective spring may move down and its other end up relative to the body of the vehicle.

Figure 7:
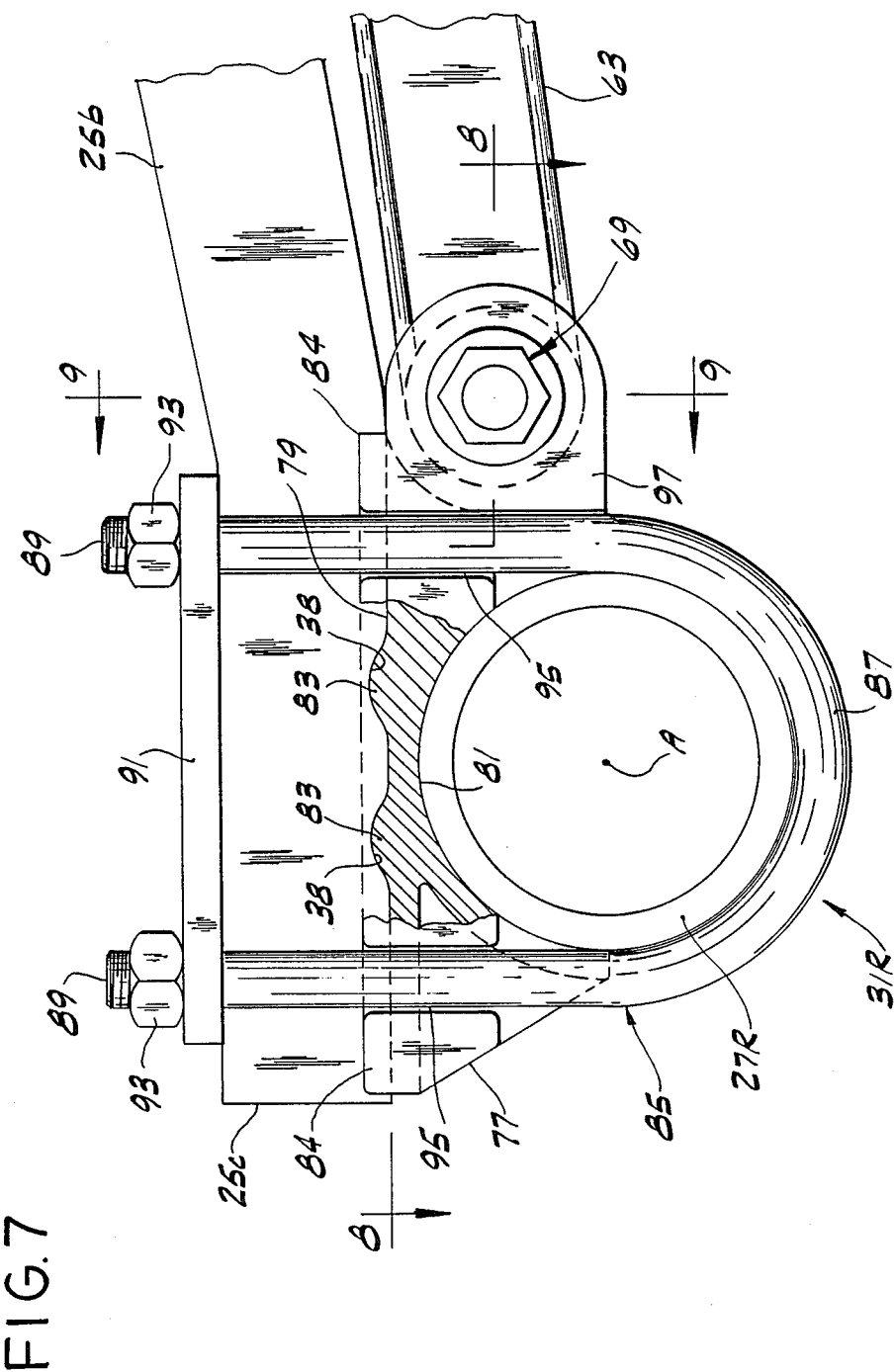
FIG. 7 is an enlarged fragment of FIG. 2 with parts broken away and shown in section.

Assuming the right-hand forward wheel encounters a bump, the other wheels being undisturbed, the front axle 27F angles up from left to right relative to the body of the vehicle (see FIG. 7). The forward end of the right-hand spring 25 may move up relative to the body of the vehicle along with the right-hand end of the axle, the forward end of the spring remaining essentially in fixed position relative to the axle perpendicular to the axle and twisting in accordance with the angling of the axle. The rear axle 27R remains horizontal. In this regard, the spring is sufficiently flexible and resilient in twist to permit the twisting without being unduly stressed, also being flexible and resilient in bending under the load thereon due to the weight of the body of the vehicle and its cargo. The forward end of the left-hand spring 25 also remains essentially in fixed position relative to the axle perpendicular to the axle 27F and twists similarly to the twisting of the right-hand spring 25, with the difference that the left-hand spring may remain level while the right-hand spring may be swung up at its forward end and down at its rearward end relative to the body of the vehicle.

Assuming the left-hand forward wheel encounters a bump, the other wheels being undisturbed, the front axle 27F angles up from right to left relative to the body of the vehicle. The forward end of the left-hand spring 25 may move up relative to the body of the vehicle with the left-hand end of the axle, the forward end of the left-hand spring remaining essentially in fixed position relative to the axle perpendicular to the axle, and twisting in accordance with the angling of the axle. The rear axle 27R remains horizontal. The rear axle 27R remains horizontal. Here, again, the spring is sufficiently flexible and resilient in twist to permit the twisting without being unduly stressed, also being flexible and resilient in bending under the load thereon due to the weight of the body of the vehicle and its cargo. The forward end of the right-hand spring 25 also remains essentially in fixed position relative to the forward axle 27F perpendicular to the axle 27F and twists similarly to the twisting of the left-hand spring 25, with the difference that the right-hand spring may remain level while the left-hand spring is swung up at its forward end and down at its rearward end relative to the body of the vehicle.

Assuming the right-hand rearward wheel encounters a bump, the other wheels being undisturbed, the rearward axle 27R angles up from left to right relative to the body of the vehicle. The rearward end of the right-hand spring 25 moves up relative to the body of the vehicle with the right-hand end of the rearward axle, the rearward end of the spring remaining essentially in fixed position relative to the axle perpendicular to the axle, and twisting in accordance with the angling of the axle. The forward axle 27F remains horizontal. The right-hand spring is thus twisted. The rearward end of the left-hand spring 25 also remains essentially in fixed position relative to the rearward axle perpendicular to the rearward axle and twists similarly to the twisting of the right-hand spring 25, with the difference that the left-hand spring remains level while the right-hand spring may be swung up at its rearward end and down at its forward end relative to the body of the vehicle.

Assuming the left-hand rearward wheel encounters bump, the other wheels being undisturbed, the rearward axle 27R angles up from right to left relative to the body of the vehicle. The rearward end of the left-hand spring 25 moves up relative to the body of the vehicle with the left-hand end of the rearward axle, the rearward end of the spring remaining essentially in fixed position relative to the axle perpendicular to the axle and twisting in accordance with the angling of the axle. The front axle 27F remains horizontal. The rearward end of the right-hand spring 25 also remains essentially in fixed position relative to the axle perpendicular to the rearward axle an twists similarly to the twisting of the left-hand beam 25, with the difference that the right-hand spring may remain level while the left-hand spring is swung up at its rearward end and down at its forward end relative to the body of the vehicle.

When the left-hand forward wheel encounters a bump at the same time that the right-hand rearward wheel encounters a bump, the forward axle 27F angles up from right to left, and the rearward axle 27R angles up from left to right (opposite to the front axle). The forward end of the left-hand spring 25 may swing up and its rearward end may swing down relative to the vehicle. The rearward end of the right-hand spring 25 may swing up and its forward end may swing down relative to the vehicle. The forward ends of the left- and right-hand spring 25 remain perpendicular to the forward axle, and the rearward ends of the left and right-hand springs 25 remain perpendicular to the rearward axle.

Conditions incurred when the right-hand forward wheel encounters a bump at the same time that the left-hand rearward wheel encounters a bump are essentially the reverse of those described in the preceding paragraph, and need no further description.

From the above, it will appear that the body 5 of the vehicle is resiliently supported on the axles by reason of its bearing on the composite springs 25, the weight of the body and its cargo being transmitted to the springs 25 essentially centrally of the length of the springs and transmitted via the springs to the road, the springs equalizing the load on the axles to reduce road shock. While the springs are subject to bending and twist, they readily take stresses to which they are subjected, noting that they are particularly efficient as regards withstanding bending stresses and flexibility for the twisting. The springs may be regarded generally as floating in the hangers; pivoting is enabled by the rocking of the springs on the bottom faces of plates 57.

It will be observed that the springs 25 are free to swing as walking beams with each swingable independently of the other, rocking at its crown 25a against the bottom face of the respective load-transmitting plate 57 in the respective hanger 41, with protection against wear of the spring at the crown where it rocks against the bottom face of plate 57 by the top 53 of the wear-resistant sleeve 51 on the crown. Swinging of one of the springs relative to the other spring is permitted by the capability of each of the springs to twist, each being a composite leaf spring as described comprising fibers embedded in a resin matrix, the fibers extending lengthwise of the spring. Stops such as indicated at 135 may be provided on the bottom of the body of the vehicle in position for engagement by the plates 91 on the ends 25c of the springs 25 for limiting the swinging of the springs. With the use of such composite springs, the weight of the suspension may be substantially reduced, particularly in respect to prior suspensions with steel springs, for a given loading. Assembly of the springs with the hangers and assembly of the axles and the springs with precision in assembly is relatively easy, parallelism of the axles being readily attained in assembly by reason of the molding of the springs with the alignment grooves 38 and the provision of the mating tongues 83 on top of the seats 77, precision being maintained by reason of the rigidity of the joints 31F and 31R including these grooves and tongues. Use of rubber bushings in the pin joints at 67, 69, 73 and 75 as described avoids wear that might otherwise be caused by metal-to-metal contact for increased life of the suspension with less maintenance.

Figure 13:
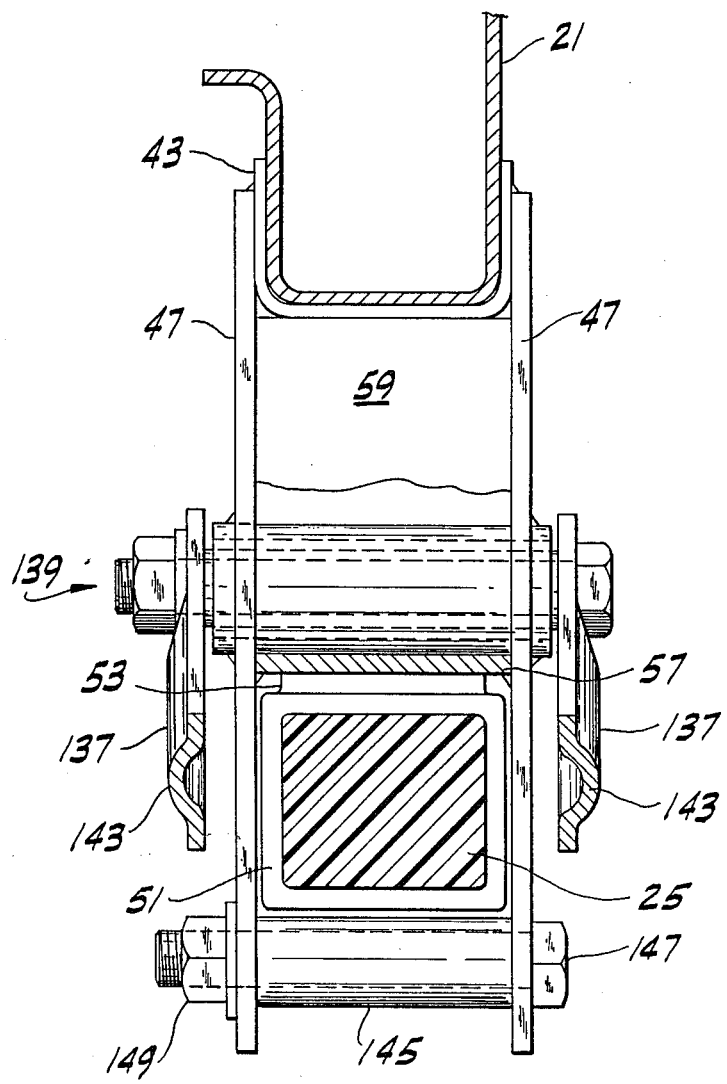

FIGS. 12 and 13 illustrate a modification wherein the drag links instead of being pin-connected in the hangers 41 below the crowns of the springs 25 are pin-connected in the hangers above the crowns. In this case, each of the drag links comprises a pair of steel bars each designated 137 extending on opposite sides of the respective spring and on the outside of the side plates 47 of the hanger between a rubber-bushed pin connection at 139 with the hanger and a rubber-bushed pin connection at 141 with the seat 77 of the respective joint 31R. Each bar is formed with a stiffening rib 143 extending from adjacent one end thereof to the other constituted by an integral portion of the bar deformed out of the plane of the bar to increase its stiffness under compression while retaining its ability to twist as may be needed (see FIG. 14). In this modification, each seat 77 is slightly modified to the extent that instead of having extensions 97 for connection of the drag link, it has a solid extension 97a having a bore therein for receiving the pin of the pin connection at 141. While the two bars 139 which constitute each drag link are of fixed length, adjustment corresponding to that provided for by the adjustable length link of FIGS. 10 and 11 may be provided for at one side by use of a pin-connection at 139 of a type which is eccentrically rotatable to adjust the location of the axis of the pin of the connection relative to the axis of the pin of connection 141. A spring retainer such as indicated at 145 is provided in each hanger 39 below the crown 25a of each spring. As appears in FIG. 15, this comprises a length of tubing extending between the side plates 47 of the hanger held in place by a bolt 147 secured by a nut 149.

Figure 16:
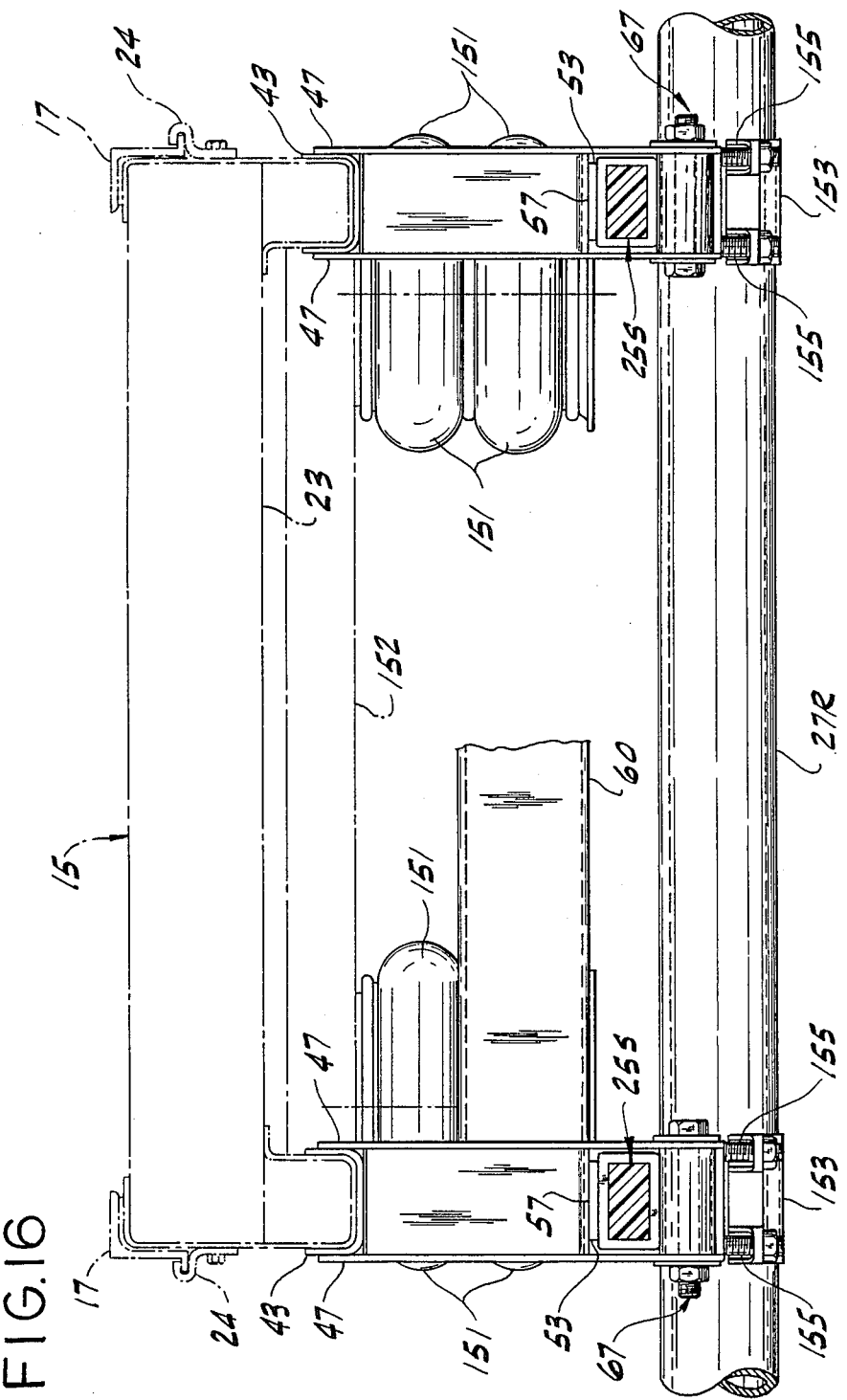
FIG. 16 is a view generally in vertical section on line 16—16 of FIG. 15.

FIGS. 15 and 16 illustrate a modification of the suspension of FIG. 2 involving the provision of air springs or air bags 151 between the top plates 91 of the joints 31F and 31R and a crosshead 152 at the bottom of the frame 15 at the bottom of the vehicle. FIGS. 15 and 16 also illustrate the use of straight instead of arched composite springs, the springs here accordingly being designated 25S. Since each spring is straight, the top 53 of the wearresistant sleeve 51 on the spring is straight, and for the rocking of the spring the plate 57 is formed with a convex curvature (convex as viewed from the bottom. As appears in FIG. 16, the central vertical axes of the air bags are located inwardly of the vertical planes of the springs 25S. FIGS. 15 and 16 also illustrate a modification of the joints 31F and 31R involving the provision of a bottom axle clamp member 153 and use of straight bolts 155 instead of U-bolts.

Figure 17:
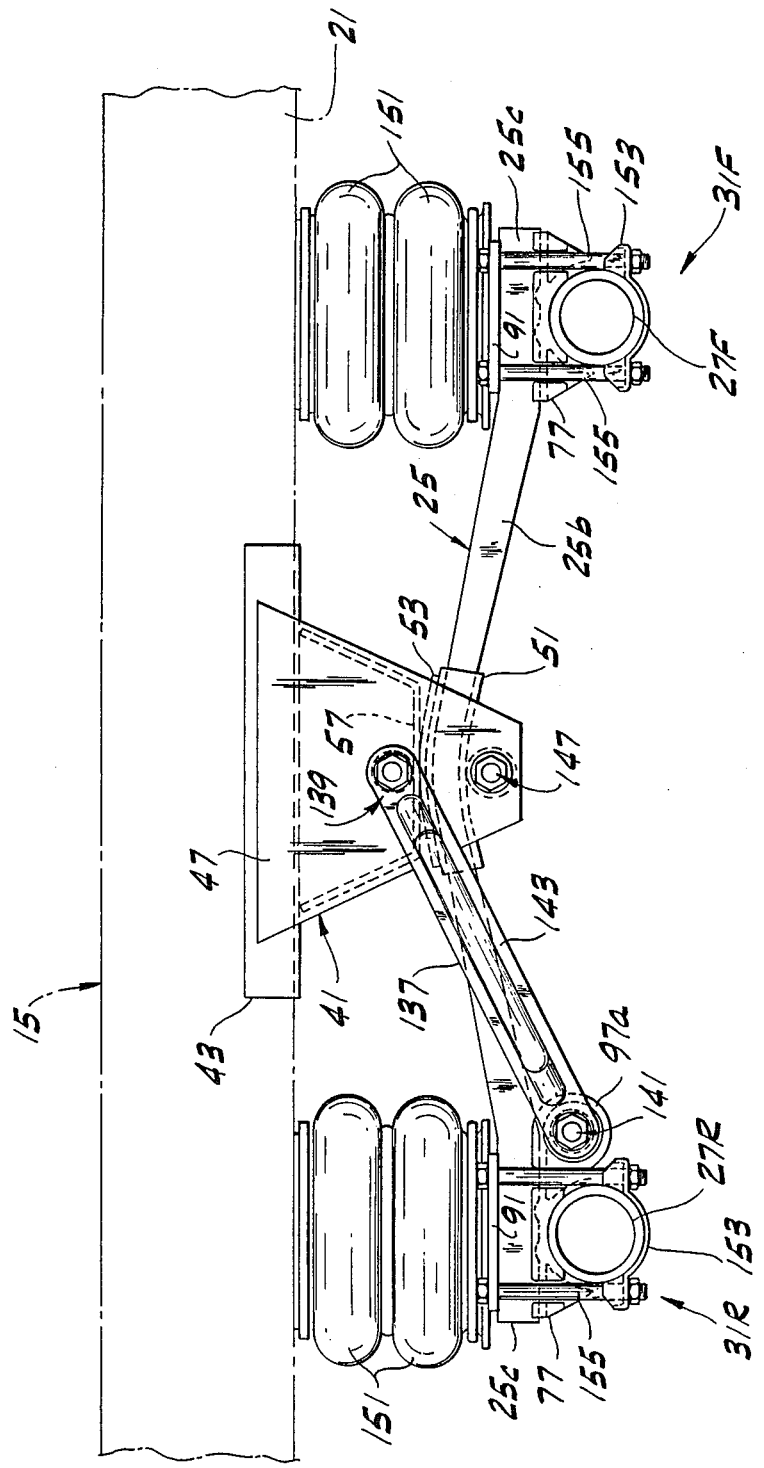
FIG. 17 is a view similar to FIG. 12 showing another modification.

FIG. 17 illustrates a modification of the suspension of FIG. 12 involving the provision of air bags and axle joints as in FIGS. 16 and 17.

Figure 18:
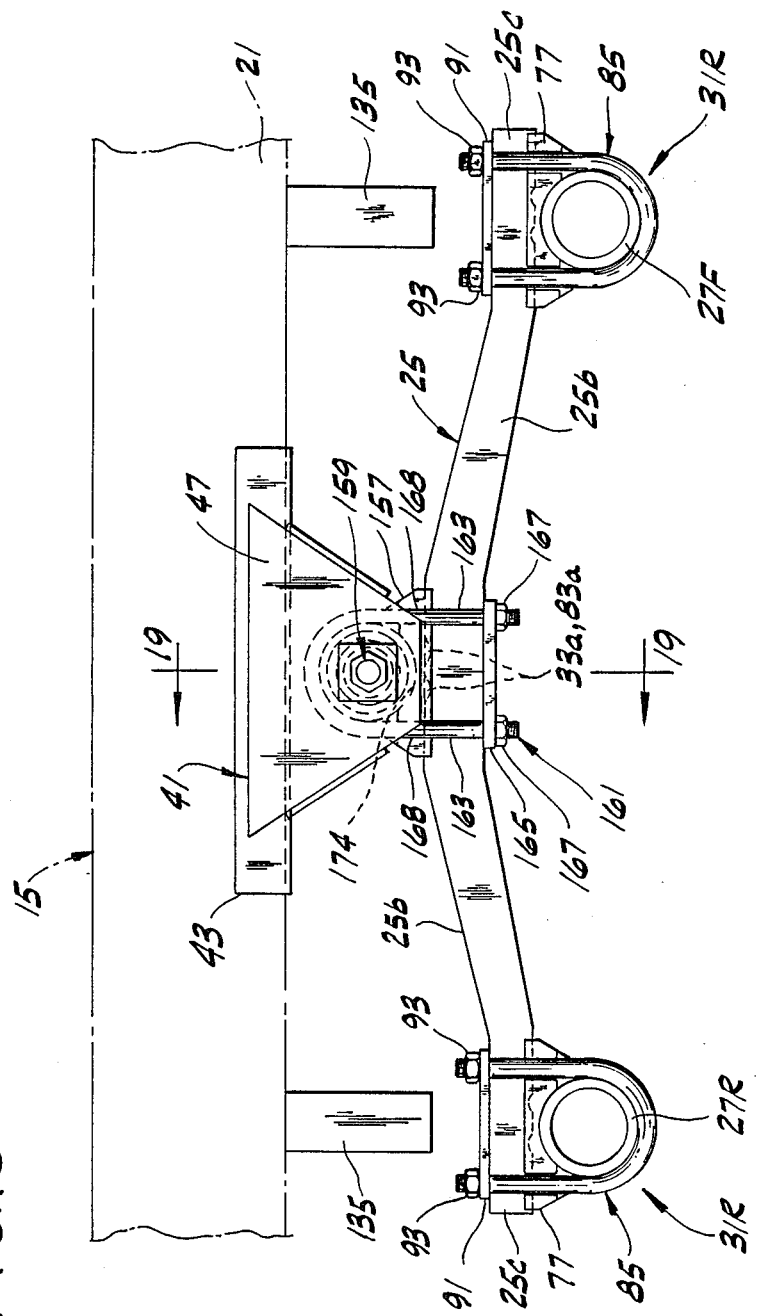
FIG. 18 is a view similar to FIG. 2 showing another modification.
Figure 19:
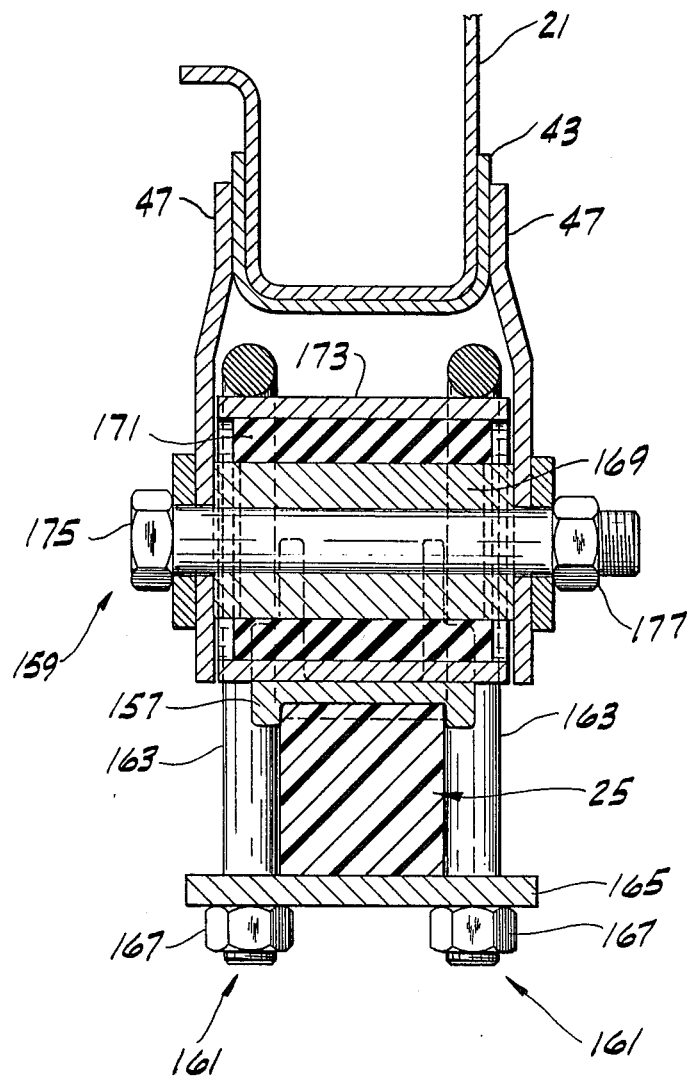
FIG. 19 is an enlarged section on line 19—19 of FIG. 18.

FIGS. 18 and 19 illustrate a modification involving what may be referred to as a single-point suspension wherein each of the arched composite springs corresponds generally to the springs 25 shown in FIG. 2 and each of the springs is clamped at its crown to an overslung seat 157 which is pivotally mounted in the respective hanger 39 by means of; a rubber-bushed pin connection 159. Each spring is formed in the top of its crown 25a with two grooves or keyways 38a corresponding to the grooves or keyways 38 of the joints 31F and 31R. The overslung seat 157 is flat with two tongues or keyways 83a corresponding to the tongues or keys 83 of the joints 31F and 31R, matching the top of the crown. The crown is clamped against the bottom of the seat with the tongues in the grooves for precision alignment by means of U-bolts 161 one on each side of the seat and having their legs 163 extending down through holes in a plate 165 at the bottom of the crown of the spring, nuts 167 being threaded up on the lower ends of the legs of the bolts tightly to clamp the crown against the bottom of the seat. The seat has grooves 168 (similar to grooves 95) at the sides thereof receiving the legs of the bolts. The rubberbushed pin connection at 159, similarly to the above-described rubber-bushed connections, comprises a steel tube 169 having a rubber sleeve 171 bonded thereon which is press-fitted in a tubular member 173 which is clamped in a part-circular recess 174 in the upper part of the seat by the U-bolts, the tube receiving a headed bolt 175 extending through bolt holes in the side plates 47 of the hanger 41 with a nut 177 threaded on the end of the bolt opposite the head and torqued to squeeze the side plates 47 against the ends of the tube.

In view of the above, it will be seen that the several objects of the invention are achieved and other advantageous results attained.

As various changes could be made in the above constructions without department from the scope of the invention, it is intended that all matter contained in the above description or shown in the accompanying drawings shall be interpreted as illustrative and not in a limiting sense.

What is claimed is:
1. A suspension for tandem axles of a vehicle comprising:
   a pair of walking springs, one for the right side and one for the left side of the vehicle, each comprising a composite leaf spring comprising fibers embed- ded in a resin matrix, the fibers generally extending lengthwise of the spring;

a pair of axles, one constituting a forward axle and the other a rearward axle;

the forward axle being secured to the springs adjacent their forward ends and the rearward axle being secured to the springs adjacent their rearward ends, each axle being secured to the springs against movement relative to the springs;

means located generally centrally of the springs mounting the springs toward the sides of the body of the vehicle below the bottom of the body with each spring extending longitudinally of the vehicle and movable longitudinally relative to said mounting means and swingable generally about the center of the length of the spring in a generally vertical plane one way or the other from a horizontal position; and means for limiting the longitudinal movement of each spring relative to its mounting means comprising link means pivotally connected at one end to the respective mounting means and at the other end to the spring adjacent the attachment of one of the axles to the spring.

2. A suspension as set forth in claim 1 wherein each mounting means has load-transmitting means bearing down on top of the respective spring generally at the center of length of the spring for transmitting load to the spring, each spring and the respective load-transmitting means being formed for rocking of the spring at the top thereof generally. at the center of length of the spring against said load-transmitting means.

3. A suspension as set forth in claim 2 wherein the restraining link means for one of the springs is adjustable in length.

4. A suspension as set forth in claim 2 wherein the mounting means for each spring comprises a hanger extending down from the bottom of the body of the vehicle having side members spaced transversely with respect to the vehicle and defining a space for receiving the central portion of the spring, said space being slightly wider than the central portion of the spring, each said load-transmitting means comprising a member extending between said side members of the respective hanger bearing down on top of the central portion of the spring.

5. A suspension as set forth in claim 4 wherein each spring has wear-resistant means on the top at least of its central portion for wear-resistant engagement with said load-transmitting member of the respective hanger.

6. A suspension as set forth in claim 5 wherein each of said springs is arched upward thereby having a crown, each spring rocking at its said crown against said load-transmitting member.

7. A suspension as set forth in claim 6 wherein each of said springs has portions extending outwardly and downwardly from its crown and generally straight horizontal end portions, the forward axle being attached to the straight end portions of the springs at the forward ends of the springs and the rearward axle being attached to the straight end portions of the springs at the rearward ends of the springs.

8. A suspension as set forth in claim 4 wherein the means for restraining each spring from longitudinal movement comprises a link pivotally connected at one end to the respective hanger and at the other to the spring adjacent the attachment of one of the axles to said spring.

9. A suspension as set forth in claim 8 wherein the restraining link for each spring is pivotally connected at one end in the respective hanger below the spring.

10. A suspension as set forth in claim 9 wherein the restraining link for one spring is of fixed length and the restraining link for the other spring is adjustable in length.

11. A suspension as set forth in claim 8 wherein each pivotal connection is a rubber-bushed pin joint.

12. A suspension as set forth in claim 4 wherein the means for restraining each spring from longitudinal movement comprises a pair of bars extending on opposite sides of the spring from a pivotal connection at one end with the hanger above the spring to the pivotal connection at the other to the spring adjacent the attachment of one of the axles to said spring.

13. A suspension as set forth in claim 12 wherein each bar has a stiffening rib extending from adjacent one end thereof to adjacent the other constituted by an integral portion of the bar deformed out of the plane of the bar.

14. A suspension as set forth in claim 12 wherein each hanger has a retainer for the respective spring therein below the central portion of the spring.

15. A suspension as set forth in claim 1 wherein the axles are attached to the springs by joints adjacent the ends of the axles and adjacent the ends of the springs, each joint comprising an axle seat having a downwardly opening recess receiving the axle, the spring extending over the top of the seat, the spring and seat having interengaging registration means for so locating the seat relative to the spring that the axle and spring are at right angles, and means for securing the axle in the recess and securing the seat to the spring.

16. A suspension as set forth in claim 15 wherein the means for securing the axle in the seat and securing the seat to the spring comprises a pair of U-bolts, one on each side of the seat, straddling the axle with the legs of the bolts extending up through holes in a plate on top of the spring, and nuts threaded down on the upper ends of the legs of the bolts against the plate.

17. A suspension as set forth in claim 15 wherein said registration means comprises at least one groove in the bottom of the spring extending across the opening and a tongue integral with the seat extending across the top of the seat received in the groove.

18. A suspension as set forth in claim 17 wherein the seat also has grooves at the sides thereof receiving the legs of the U-bolts.

19. A suspension as set forth in claim 15 wherein the means for securing the axle in the recess in the seat and securing the seat to the spring comprises a clamp member engaging the bottom of the axle, a plate engaging the top of the end of the spring, and bolts extending through the plate and clamp member.

20. A suspension as set forth in claim 15 wherein the means for securing the axle in the recess in the seat and securing the seat to the spring includes a clamp plate on top of the end of the spring, and said suspension having air springs between the clamp plates and the body of the vehicle.

21. A suspension as set forth in claim 1 having air springs between the ends of said composite leaf springs and the body of the vehicle.

22. A suspension for tandem axles of a vehicle comprising:

a pair of walking springs, one for the right side and one for the left side of the vehicle, each comprising a composite leaf spring comprising fibers embedded in a resin matrix, the fibers generally extending lengthwise of the spring;

a pair of axles, one constituting a forward axle and the other a rearward axle;

the forward axle being attached to the springs adjacent their forward ends and the rearward axle being attached to the springs adjacent their rearward ends;

means located generally centrally of the springs mounting the springs toward the sides of the body of the vehicle below the bottom of the body with each spring extending longitudinally of the vehicle and with each spring swingable generally about the center of the length of the spring in a generally vertical plane one way or the other from a horizontal position;

means for restraining each spring from longitudinal movement relative to its said mounting means; the axles being attached to the springs by joints adjacent the ends of the axles and adjacent the ends of the springs, each joint comprising an axle seat having a downwardly opening recess receiving the axle, the spring extending over the top of the seat, the spring and seat having interengaging registration means for so locating the seat relative to the spring that the axle and spring are at right angles, and means for securing the axle in the recess and securing the seat to the spring.

23. A suspension as set forth in claim 22 wherein the means for securing the axle in the seat and securing the seat to the spring comprises a pair of U-bolts, one on each side of the seat, straddling the axle with the legs of the bolts extending up through holes in a plate on top of the spring, and nuts threaded down on the upper ends of the legs of the bolts against the plate.

24. A suspension as set forth in claim 22 wherein said registration means comprises at least one groove molded in the bottom of the spring extending across the opening and a tongue integral with the seat extending across the top of the seat received in the groove.

25. A suspension as set forth in claim 24 wherein the seat also has grooves at the sides thereof receiving the legs of the U-bolts.

* * * * *

UNITED STATES PATENT AND TRADEMARK OFFICE
CERTIFICATE OF CORRECTION

PATENT NO. : 4,871,188

DATED : October 3, 1989

INVENTOR(S) : Bobby G. Baxter

It is certified that error appears in the above-identified patent and that said Letters Patent is hereby corrected as shown below:

On the title page, "Reel 4926, Frames 491 & 492" after "Assignee" should read -- "The Binkley Company, Warrenton, MO." --

Column 1, lines 9 & 10, "Suspension, which is incorporated herein by reference." should read -- Suspension, issued as U.S. Patent No. 4,789,181 December 6, 1988, which is --.

Column 1, line 20, "009,503, one" should read -- 009,503 (U.S. Patent No. 4,789,181), one --.

Column 1, line 28, "009,503 and" should read -- 009,503 (U.S. Patent No. 4,789,181) and --.

Column 2, line 44, "009,503, is" should read -- 009,503 (U.S. Patent No. 4,789,181), is --.

Column 3, line 14, "is rigidly" should read -- is secured by being rigidly --.

Column 3, line 16, "is rigidly" should read -- is secured by being rigidly --.

Column 4, line 68, "by a" should read -- by link means comprising a --.

Column 5, line 1, "drag link pivotally" should read -- drag link for limiting longitudinal movement of the spring pivotally --.

Column 9, line 5, "beams with" should read -- beams and thus may be referred to as walking springs with --.

UNITED STATES PATENT AND TRADEMARK OFFICE
CERTIFICATE OF CORRECTION

PATENT NO. : 4,871,188

DATED : October 3, 1989

INVENTOR(S) : Bobby G. Baxter

It is certified that error appears in the above-identified patent and that said Letters Patent is hereby corrected as shown below:

Column 9, line 19 & 20, "springs. With" should read -- springs. It will also be observed that the springs are movable longitudinally in the hangers relative to the hangers but restrained from or limited in longitudinal movement by the drag links. With --.

Column 11, lines 33 & 34, "the restraining link" should read -- the said link --.

Column 11, line 34, "for one" should read -- for limiting the longitudinal movement of one --.

Column 11, lines 63 & 64, "the means" should read -- the link means --.

Column 11, line 64, "for restraining each spring from longitudinal" should read -- for limiting the longitudinal --.

Column 11, line 65, "movement comprises" should read -- movement of each spring comprises --.

Column 12, lines 10 & 11, "the means" should read -- the link means --.

Column 12, line 11, "for restraining each spring from longitudinal" should read -- for limiting the longitudinal --.

Column 12, line 12, "movement comprises" should read -- movement of each spring comprises --.

UNITED STATES PATENT AND TRADEMARK OFFICE
CERTIFICATE OF CORRECTION

PATENT NO. : 4,871,188

DATED : October 3, 1989

INVENTOR(S) : Bobby G. Baxter

It is certified that error appears in the above-identified patent and that said Letters Patent is hereby corrected as shown below:

Column 12, lines 58 & 59, "Suspension having air" should read --suspension has air--.

Signed and Sealed this

Ninth Day of October, 1990

Attest:

HARRY F. MANBECK, JR.

Attesting Officer

Commissioner of Patents and Trademarks